(12) United States Patent
Goldberg et al.

(10) Patent No.: US 12,177,000 B2
(45) Date of Patent: Dec. 24, 2024

(54) DELIVERY OF EXTENDED EMERGENCY NOTIFICATIONS THROUGH SENSORY FEEDBACK

(71) Applicant: SONY GROUP CORPORATION, Tokyo (JP)

(72) Inventors: Adam Goldberg, Fairfax, VA (US); Brant Candelore, Poway, CA (US)

(73) Assignee: SONY GROUP CORPORATION, Tokyo (JP)

( * ) Notice: Subject to any disclaimer, the term of this patent is extended or adjusted under 35 U.S.C. 154(b) by 221 days.

(21) Appl. No.: 17/872,435

(22) Filed: Jul. 25, 2022

(65) Prior Publication Data
US 2024/0031047 A1 Jan. 25, 2024

(51) Int. Cl.
*H04H 20/59* (2008.01)

(52) U.S. Cl.
CPC .................... *H04H 20/59* (2013.01)

(58) Field of Classification Search
CPC ...................................... H04H 20/59
See application file for complete search history.

(56) References Cited

U.S. PATENT DOCUMENTS

| | | | | |
|---|---|---|---|---|
| 6,215,996 B1 * | 4/2001 | Fujita | ................. | H04W 88/181 455/445 |
| 7,889,092 B2 * | 2/2011 | Volk | ....................... | H04H 20/59 340/331 |
| 9,800,953 B2 * | 10/2017 | Kwak | ..................... | H04N 19/89 |
| 10,062,271 B2 | 8/2018 | Stewart | | |
| 10,754,428 B1 * | 8/2020 | Parise | ....................... | H04R 3/04 |
| 2010/0035662 A1 * | 2/2010 | Mizuta | .................... | H04M 1/04 455/569.1 |
| 2013/0212621 A1 * | 8/2013 | Corl | ..................... | H04N 21/814 725/115 |
| 2014/0287711 A1 * | 9/2014 | Williams | ................ | H04W 4/12 455/566 |
| 2014/0354442 A1 * | 12/2014 | Maity | .................. | G08B 27/005 340/691.6 |
| 2015/0061895 A1 * | 3/2015 | Ricci | ...................... | G06V 40/28 340/902 |
| 2016/0049070 A1 * | 2/2016 | Stewart | ............... | G08B 27/005 340/540 |

(Continued)

FOREIGN PATENT DOCUMENTS

| | | | | |
|---|---|---|---|---|
| EP | 3490266 B1 * | 9/2022 | ............ | H04H 20/59 |
| JP | 06168381 A * | 6/1994 | | |

(Continued)

*Primary Examiner* — Chico A Foxx
(74) *Attorney, Agent, or Firm* — CHIP LAW GROUP

(57) ABSTRACT

An electronic device and method for delivery of extended emergency notifications through sensory feedback is provided. The electronic device receives a signal from an Emergency Alert System (EAS) that includes one or more of a broadcast system or an Internet-based system. The electronic device extracts emergency information from the received signal. Thereafter, the electronic device determines an external device that is communicatively coupled to the electronic device. The electronic device controls the external device to generate a type of sensory feedback that corresponds to an emergency alert. The type of sensory feedback is generated based on at least a portion of the emergency information.

18 Claims, 8 Drawing Sheets

(56) References Cited

U.S. PATENT DOCUMENTS

| | | | |
|---|---|---|---|
| 2017/0018168 A1* | 1/2017 | Beernink | G08B 7/06 |
| 2017/0171640 A1* | 6/2017 | Shintani | H04N 21/485 |
| 2017/0201337 A1* | 7/2017 | Michael | H04N 21/814 |
| 2018/0165945 A1* | 6/2018 | McClendon | G01S 19/17 |
| 2021/0084710 A1* | 3/2021 | Sutherland | H04W 4/021 |
| 2022/0007164 A1* | 1/2022 | Sutherland | H04L 63/0853 |
| 2022/0076282 A1* | 3/2022 | Monassebian | G06Q 30/0201 |
| 2022/0269256 A1* | 8/2022 | Duraisingh | G05B 23/0272 |
| 2023/0042613 A1* | 2/2023 | Kotaru | H04N 21/4382 |
| 2024/0114326 A1* | 4/2024 | Musgrove | H04W 4/90 |

FOREIGN PATENT DOCUMENTS

| | | | | |
|---|---|---|---|---|
| JP | 2017-184224 A | | 10/2017 | |
| KR | 10-2020-0143797 A | | 12/2020 | |
| WO | WO-2016210110 A1 | * | 12/2016 | G01S 19/17 |

* cited by examiner

DELIVERY OF EXTENDED EMERGENCY NOTIFICATIONS THROUGH SENSORY FEEDBACK

CROSS-REFERENCE TO RELATED APPLICATIONS/INCORPORATION BY REFERENCE

None.

FIELD

Various embodiments of the disclosure relate to emergency alert notifications. More specifically, various embodiments of the disclosure relate to an electronic device and a method for delivery of extended emergency notifications through sensory feedback.

BACKGROUND

Advancements in the field of Internet and broadcasting technology have led to development of various services that may allow electronic devices, such as, televisions, to act as a receiver and presenter of emergency alert messages. For example, Emergency Alert Services (EAS) may be common emergency procedures that may be used to disseminate emergency information to the general public within a given region using Internet or broadcast stations. Advanced Television Systems Committee (ATSC) has provisions for dissemination of emergency alerts using broadcast channels (such as television broadcast channels) for individual regions. For example, ATSC 3.0 may provide enhancements in delivery of emergency announcements via Advanced Emergency Alert (AEA). Further, ATSC 3.0 may provide mechanisms that may enable devices (such as a television) to monitor transmission of emergency information and wake-up on reception of signaling relevant to transmission of an emergency alert. The enhancements may significantly improve verbal and visual delivery of the emergency information. However, in some scenarios, there may be users who may not be in proximity of the television screen or the display monitor to view and receive the emergency announcements. In some other scenarios, the emergency announcements may not be conveyed effectively to users who may have visual or hearing impairments. The non-delivery of the emergency announcements may affect safety and well-being of the users.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for delivery of extended emergency notifications through sensory feedback, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
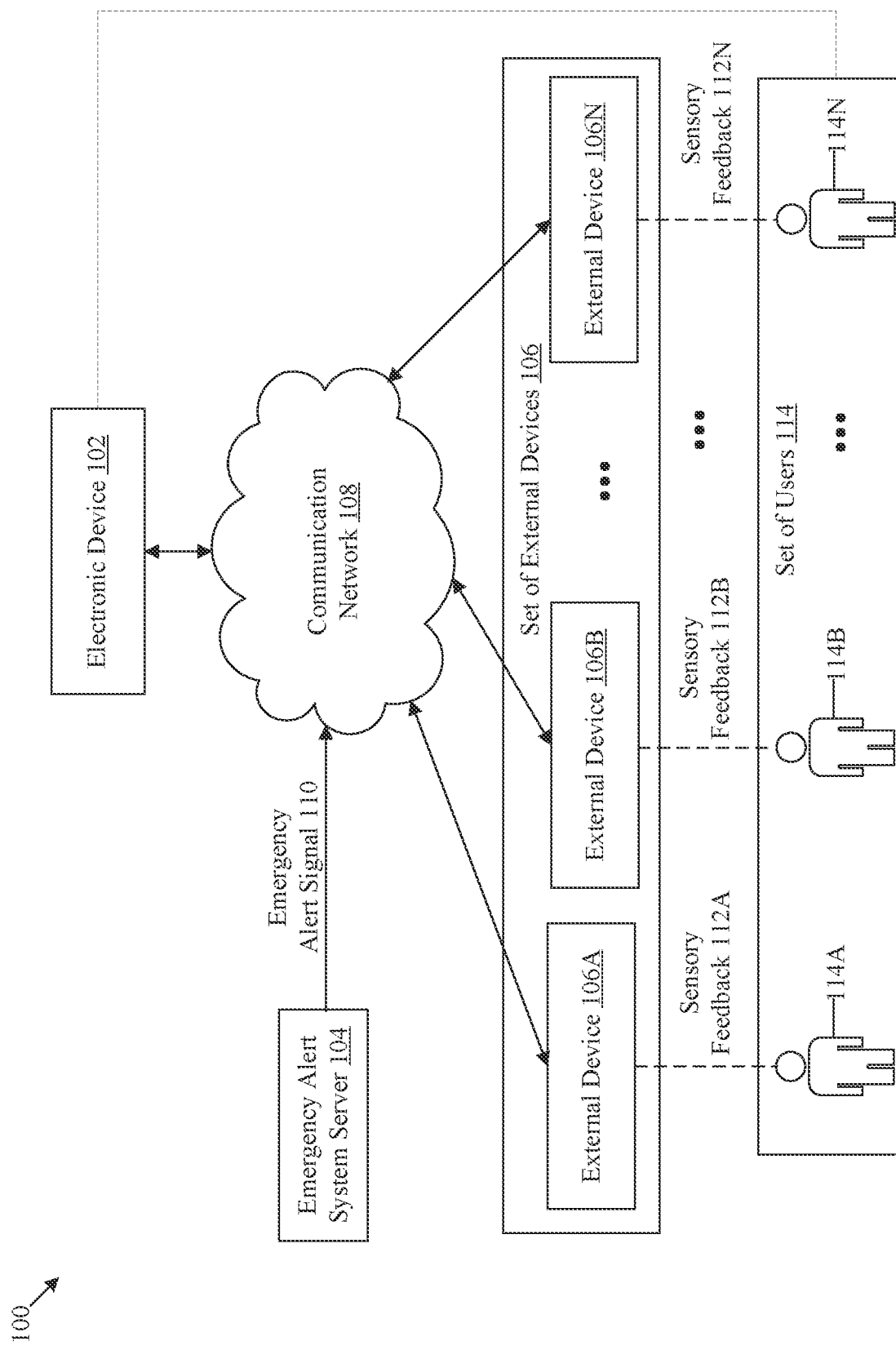
FIG. 1 is a diagram that illustrates an exemplary network environment for delivery of extended emergency notifications through sensory feedback, in accordance with an embodiment of the disclosure.

The following described implementations may be found in a disclosed electronic device and method for delivery of extended emergency notifications through a sensory feedback. Exemplary aspects of the disclosure provide an electronic device, for example, a device capable of reception of Advanced Television Systems Committee (ATSC) signals from a broadcaster device. The electronic device may receive a signal (for example, an ATSC 1.0 signal or an ATSC 3.0 signal) from an Emergency Alert System (EAS) that may include one or more of a broadcast system or an Internet-based system. The electronic device may extract emergency information (for example, a text, an audio signal, a video signal, or information that may correspond to an emergency alert) from the received signal. The electronic device may determine an external device (for example, a lighting fixture, a handheld mobile device, a wearable device, or a handsfree device) that may be communicatively coupled to the electronic device. The electronic device may control the external device to generate a type of sensory feedback (for example, a visual feedback or a somatosensory feedback) that may correspond to an emergency alert. The type of sensory feedback may be generated based on at least a portion of the emergency information.

EAS messages including emergency alerts may be disseminated through broadcast systems or Internet based systems. The terrestrial-based broadcast systems have laid down standard guidelines that may allow extension of notifications for emergency alerts using verbal or visual signals. Though the guidelines may facilitate acquisition of information relevant to an emergency alert, most of such information may be required to be accessed from visual signals using electronic devices such as television, display screens, or computer monitors coupled to ATSC-based tuners. However, all people may not have access to the visual information relevant to the emergency alert. For example, sometimes people may be pre-occupied in a task and may not be in a position to view the information on a television or a monitor. Further, people with some kind of disability (for example, visual impairment or hearing impairment) may not be able to hear the emergency alert or view the visual information relevant to the emergency alert. Such people may miss the notifications of the emergency alert. For safety of the users, it may be of importance to ensure that all users have access to the notifications disseminated to the public. Any delay in delivery of the notifications may jeopardize the safety and well-being of the people, especially disabled people.

In order to address issues related to the delivery of notifications of emergency alerts, the disclosed electronic device may operate as a wireless hub to disseminate or share emergency information with devices that may be connected to the electronic device. The disclosed electronic device may utilize the emergency information to control the connected devices. The electronic device may determine capabilities of the connected devices to generate different types of sensory feedbacks and control such devices to generate the sensory feedbacks to deliver emergency alerts to the users. For example, the electronic device may control a wearable haptic device to generate haptic feedback and deliver an emergency notification through the haptic feedback to a user. The haptic feedback may be caused by an application of a vibration on a portion of a user's body that may be in contact with the wearable haptic device. The sensory feedback may facilitate dissemination of the emergency notifications to all users, including users with disabilities (such as, visual or hearing impairments).

FIG. 1 is a diagram that illustrates an exemplary network environment for delivery of extended emergency notifications through sensory feedback, in accordance with an embodiment of the disclosure, in accordance with an embodiment of the disclosure. With reference to FIG. 1, there is shown a network environment 100. The network environment 100 includes an electronic device 102, an Emergency Alert System (EAS) server 104, and a set of external devices 106. The set of external devices 106 may include an external device 106A, an external device 106B, ..., and an external device 106N. The electronic device 102 may communicate with the EAS server 104 and/or the set of external devices 106, through one or more networks (such as, a communication network 108). The electronic device 102 may receive a signal (for example, an emergency alert signal 110) from the EAS server 104. The electronic device 102 may control each external device of the set of external devices 106 to generate a corresponding sensory feedback. For example, the electronic device 102 may control the external device 106A to generate a sensory feedback 112A. Similarly, the electronic device 102 may control the external device 106B, ... and the external device 106N, to generate a sensory feedback 112B, ... and a sensory feedback 112N, respectively. Collectively, sensory feedbacks 112A, 112B, ... and 112N are referred herein as a set of sensory feedback 112. There is further shown a set of users 114 who may be associated with the set of external devices 106. For example, a user 114A may be associated with the external device 106A. Similarly, a user 114B may be associated with the external device 106B, ... and a user 114N may be associated with the external device 106N.

The "N" number of external devices, "N" number of sensory feedbacks, and "N" number of users shown in FIG. 1 is presented merely as an example. The set of external devices 106, the set of sensory feedbacks 112, and the set of users 114 may include only one or more than "N" external devices, sensory feedbacks, users, respectively, for delivery of extended emergency notifications by the electronic device 102, without deviation from the scope of the disclosure. For the sake of brevity, only "N" external devices, "N" sensory feedbacks, and "N" users have been shown in FIG. 1. However, in some embodiments, there may be more than "N" external devices, "N" sensory feedbacks, and "N" users, without limiting the scope of the disclosure.

The electronic device 102 may include suitable logic, circuitry, interfaces, and/or code that may be configured to provide extended emergency notifications. The electronic device 102 may receive an emergency signal from an emergency alert source (such as, the EAS server 104) and control each external device of the set of external devices 106 to generate a type of sensory feedback based on the received emergency signal. The sensory feedback, generated by each external device of the set of external devices 106, may correspond to an emergency notification or an emergency alert. Examples of the electronic device 102 may include, but are not limited to, a television that may be coupled to at least one of an Advanced Television Systems Committee (ATSC) 1.0 tuner and an ATSC 3.0 tuner, a smart Television (TV) coupled to a ATSC 1.0 tuner or an ATSC 3.0 tuner, an Internet-Protocol TV (IPTV) coupled to a ATSC 1.0 tuner or an ATSC 3.0 tuner, a display device or a computer monitor coupled to a ATSC 1.0 tuner or an ATSC 3.0 tuner, a consumer electronic (CE) device including a display and coupled to a ATSC 1.0 tuner or an ATSC 3.0 tuner.

In some embodiments, the electronic device 102 may receive Digital TV (DTV) signals from an over-the-air or a terrestrial broadcast network via at least one of the ATSC 1.0 tuner or an ATSC 3.0 tuner. The electronic device 102 may be configured to extract emergency information from the received DTV signal. Thereafter, the electronic device 102 may transmit the emergency information to the smart TV, the IPTV, the display monitor, the computer monitor, or the CE including the display. However, in some embodiments, the functionality of the ATSC 1.0 tuner or the ATSC 3.0 tuner may be incorporated in its entirety or at least partially in the electronic device 102 (such as the smart TV, the display monitor, the computer monitor, the IPTV, or the CE with display), without departing from the scope of the present disclosure.

The EAS server 104 may include suitable logic, circuitry, and interfaces, and/or code that may be configured to store information associated with an emergency alert signal 110 and transmit the emergency alert signal 110 to the electronic device 102. In an exemplary embodiment, the EAS server 104 may be implemented as a cloud server and may execute operations through web applications, cloud applications, HTTP requests, repository operations, file transfer, and the like. Other example implementations of the EAS server 104 may include, but are not limited to, a database server, a file server, a content server, a web server, an application server, a mainframe server, or a cloud computing server. In at least one embodiment, the EAS server 104 may be implemented as a plurality of distributed cloud-based resources by use of several technologies that are well known to those ordinarily skilled in the art. A person with ordinary skill in the art will understand that the scope of the disclosure may not be limited to the implementation of the EAS server 104 and the electronic device 102 as two separate entities. In certain embodiments, the functionalities of the EAS server 104 may be incorporated in its entirety or at least partially in the electronic device 102, without a departure from the scope of the disclosure.

Though not shown in FIG. 1, the network environment 100 may further include a service provider device that may be connected to the electronic device 102 through the communication network 108. The service provider device may include suitable logic, circuitry, and/or interfaces that may be configured to transmit and receive signals associated with one or more service providers. The transmitted or received signals may correspond to a set of broadcast channels, for example, radio frequency (RF) signals, which may be broadcasted in a certain geographical region. For example, each service provider device may include a transmitter configured to transmit selected broadcast channel information, that comprises the emergency alert signal 110, to the electronic device 102 based on a current geo-location of the electronic device 102 within its emissions (like an available channel guide in the region). In an embodiment, the EAS server 104 may include service provider devices of one or more of a television broadcast system or an Internet-based system. Examples of the service provider may include, but are not limited to, a satellite broadcaster, a terrestrial broadcaster, a digital television broadcaster, a cellular network broadcaster, or Internet broadcaster. Examples of the service provider devices may include, but are not limited to, a radio antenna, a monopole antenna, a dipole antenna, an array antenna, or a loop antenna.

Each of the set of external devices 106 may include suitable logic, circuitry, and interfaces, and/or code that may be configured to generate a sensory feedback. The generated sensory feedback may correspond to an emergency alert. Each of the set of external devices 106 may be configured to generate a specific type of sensory feedback (for example, the sensory feedback 112A, 112B, . . . and 112N) based on a command received from the electronic device 102. Examples of the set of external devices 106 may include, but are not limited to, a smartphone, a cellular phone, a mobile phone, a gaming device, an electronically controlled lighting fixture, a handheld mobile device with an in-built display, a wearable or head-mounted display, an augmented reality (AR)/virtual reality (VR) device, a television remote, a voice-command device with an integrated virtual assistant, a wearable haptic device, or a handsfree device.

The communication network 108 may include a communication medium through which the electronic device 102, the EAS server 104, and the set of external devices 106 may communicate with each other. The communication network 108 may be a wired or wireless communication network. Examples of the communication network 108 may include, but are not limited to, Internet, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may be configured to receive a signal (for example, the emergency alert signal 110). The electronic device 102 may receive the signal from an EAS that includes one or more of a television broadcast system or an Internet-based system. For example, the emergency alert signal 110 may be received from the EAS server 104 or a service provider device of a service provider. The emergency alert signal 110 may be an ATSC 1.0 signal or an ATSC 3.0 signal. The electronic device 102 may receive the ATSC 1.0 signal or the ATSC 3.0 signal from the television broadcast system or the Internet-based system, via an ATSC 1.0 tuner or an ATSC 3.0 tuner.

The electronic device 102 may be further configured to extract emergency information from the received signal. In accordance with an embodiment, the emergency information may include at least a portion that may indicate a type of sensory feedback to be delivered to a user through an external device to convey an emergency alert corresponding to the emergency information. The electronic device 102 may be configured to control at least one external device of the set of external devices 106 to generate a type of the sensory feedback specified in the portion of the extracted emergency information. For example, the electronic device 102 may determine, based on the extracted emergency information, that the type of sensory feedback to be delivered is an audio feedback. In such case, the electronic device 102 may control the set of external devices 106 (such as a speaker, a voice-command device with an integrated virtual assistant, or a handsfree device) to generate audio feedback. The emergency alert may be conveyed through the audio feedback. Similarly, if the electronic device 102 determines, based on the extracted emergency information, that the type of sensory feedback to be delivered is a visual feedback, the electronic device 102 may control the set of external devices 106 (such as, an electronically controlled lighting fixture, a handheld mobile device with an in-built display, a wearable smart watch, or a wearable or head-mounted display) to generate the visual feedback. Thus, the emergency alert may be conveyed through the visual feedback.

The electronic device 102 may be further configured to determine a type of emergency based on the extracted emergency information. In accordance with an embodiment, the type of emergency may be indicated as one of a plurality of grades. For example, the type of emergency may vary from a first grade to a fifth grade. The severity (or urgency) of the emergency may reduce progressively from the first grade to the fifth grade. The emergency alert signal 110, broadcasted by the EAS server 104, may include an indicator that may specify the grade or severity level associated with the emergency. The EAS server 104 may set the indicator based on a location at which the emergency alert signal 110 is to be broadcasted. The electronic device 102 may determine, via extraction of the emergency information, the grade based on a value of the indicator in the emergency alert signal 110.

For example, the EAS server 104 may be required to broadcast, via a television broadcast system or an Internet-based system, the emergency alert signal 110 to users (of the set of users 114) located in an area where there may be a possibility of a drone strike or missile strike. In such a scenario, the EAS server 104 may set the indicator, included in the emergency alert signal 110, as the first grade. The electronic device 102 may determine that the type of emergency (may be of the first grade), based on the extraction of the indicator of severity included in the emergency alert signal 110, received from the EAS server 104. In another example, the indicator may be set to the first grade in case the emergency alert signal 110 is to be broadcasted in areas prone to a high risk of severe natural disasters, such as, a tornado, a hurricane, a deluge, a cyclone, a tsunami, an earthquake, a blizzard, or a wildfire.

In an example, the type of emergency may be indicated to be of the second grade if the area may be close to another area that may prone to the natural disasters or if impact of the natural disaster in the area may predicted to be moderate to high. The EAS server 104 may indicate, in the emergency alert signal 110, that the type of emergency is of third grade in case the emergency alert signal 110 corresponds to a public safety alert, a lockdown alert, or a weather alert (such as, a likelihood of rain). The EAS server 104 may indicate, in the emergency alert signal 110, that the type of emergency is of fourth grade in case the emergency alert signal 110 corresponds to safety messages, follow-up evacuation instructions, post-emergency information, or media communications. The EAS server 104 may indicate, in the emergency alert signal 110, that the type of emergency is of the fifth grade if the emergency alert signal 110 corresponds to traffic information, a list of shelters that may be used in event of an emergency, or information relevant to preparation of an impending emergency.

The electronic device 102 may be further configured to determine an external device communicatively coupled to the electronic device 102. For example, the electronic device 102 may initiate an establishment of a wireless or wired communication session between the electronic device 102 and an external device to detect whether the electronic device 102 may be communicatively coupled to the external device. For example, the electronic device 102 may determine that the set of external devices 106, i.e., the external device 106A, the external device 106B, . . . and the external device 106N, may be communicatively coupled to the electronic device 102.

In accordance with an embodiment, the electronic device 102 may be configured to determine capability information of the external device that may be communicatively coupled to the electronic device 102. For example, based on a successful establishment of the communication session of the electronic device 102 with an external device, the electronic device 102 may determine the capability information of the external device. The electronic device 102 may determine capability of each external device of the set of external devices 106 to generate a specific type of sensory feedback that may be used to convey an emergency alert. The capability information of each external device of the set of external devices 106 may be determined based on the determination of the external device. For example, the electronic device 102 may be configured to determine capability information of the external device 106A based on the determination that the external device 106A is communicatively coupled to the electronic device 102. Similarly, the electronic device 102 may determine capability information of each of the external devices 106B, . . . and 106N based on the determination that the external devices 106B, . . . and 106N are communicatively coupled to the electronic device 102. The electronic device 102 may be configured to determine types of the sensory feedbacks 112A, 112B, . . . and 112N that may be generated by the external devices 106A, 106B, . . . and 106N, based on the capability information determined for the external devices 106A, 106B, . . . , and 106N, respectively. For example, the electronic device 102 may determine that the external device 106A may be capable of generation of an audio feedback based on the determined capability information of the external device 106A. Similarly, the electronic device 102 may determine that the external devices 106B, . . . and 106N of the set of external devices 106 may be capable of generation of an audio feedback, a visual feedback, a haptic feedback, and/or a somatosensory feedback, based on the capability information of each of the external devices 106B, . . . and 106N.

In accordance with an embodiment, the electronic device 102 may be configured to receive user preferences from users of the set of users 114. The user preferences may be received as user inputs from the users or via external devices of the set of external devices 106. The reception of the user preferences may be based on the determination of the one or more external devices. The user preferences may specify one or more types of sensory feedback that may be preferred to be received by the respective users of the set of users 114. The electronic device 102 may control the external devices of the set of external devices 106, associated with the users of the set of users 114, to generate the different types of sensory feedback for delivery of the emergency alert. For example, the electronic device 102 may be configured to receive a user preference from the user 114A (or via the external device 106A) that may specify that the sensory feedback 112A, such as, an audio feedback, a visual feedback, a haptic feedback, and/or a somatosensory feedback may be modes of sensory feedback that may be preferred by the user 114A. The electronic device 102 may control the external device 106A to generate the sensory feedback 112A to convey the emergency alert, based on the user preferred modes of sensory feedback (i.e., the user preference) of the user 114A. Similarly, the electronic device 102 may be configured to receive user preferences from the users 114B, . . . and 114N or via the external devices 106B, . . . and 106N. The electronic device 102 may control the external devices 106B, . . . and 106N to generate respective sensory feedbacks 112B, . . . and 112N, based on the respective user preferences received from the users 114B, . . . and 114N.

The electronic device 102 may be further configured to control the external device to generate the type of sensory feedback that may correspond to an emergency alert. The electronic device 102 may control each external device of the set of external devices 106 to generate the type of sensory feedback. The type of sensory feedback may include a visual feedback that may be caused by a change in a color of ambient lighting, a visual feedback that may be caused by a change in a brightness of ambient lighting, a visual feedback that may be caused by a change in a color temperature of ambient lighting, a visual feedback that may be caused by a rate of the change in the brightness, the color, or the color temperature, a haptic feedback, a somatosensory feedback that may emulate a sense of cold or warmth, or a somatosensory feedback that may emulate a sense of tactile touch. For example, the electronic device 102 may control an electronically controlled lighting fixture to generate a visual feedback based on a change of at least one of color, brightness, and temperature of ambient lighting, or change of a rate of change of at least one of the color, the brightness, and the temperature of ambient lighting. The electronic device 102 may further control a wearable haptic device to generate a haptic feedback.

In accordance with an embodiment, the electronic device 102 may control one or more external devices of the set of external devices 106 to generate a sensory feedback of a specific type based on the determined type of sensory feedback specified in the portion of the extracted emergency information. The electronic device 102 may determine, based on capability information of the one or more external devices of the set of external devices 106, one or more external devices that may have the capability to generate the sensory feedback of the type specified in the portion of the extracted emergency information. For example, the electronic device 102 may determine that haptic feedback may be specified in the portion of the extracted emergency information. The electronic device 102 may transmit one or more commands to a wearable haptic device for generation of the haptic feedback as the wearable haptic device may be determined as a device capable of generation of the haptic feedback. The one or more commands may trigger the wearable haptic device to generate the haptic feedback to convey an emergency alert to one or more users of the set of users 114.

In accordance with an embodiment, the electronic device 102 may control the set of external devices 106 to generate a type of sensory feedback based on the determined type of emergency indicated in the emergency alert signal 110. For example, the electronic device 102 may determine external devices of the set of external devices 106 in a user environment. The electronic device 102 may select at least one of the determined external devices based on the type of emergency. The electronic device 102 may control the selected external devices in the user environment to generate sensory feedbacks of types that the selected external devices may be capable of generation. In an embodiment, a number of external devices (that may be selected by the electronic device 102 for the generation of the sensory feedbacks) may be based on the severity of emergency. For example, if the type of emergency is of the first grade, all the determined external devices that may be capable to generate the sensory feedback may be selected to generate the sensory feedback to alert the user promptly. On the other hand, if the type of emergency is of the fifth grade, a single external device that may be capable to generate the sensory feedback may be selected to generate the sensory feedback.

For example, the electronic device 102 may determine four external devices in the living environment of a user of the set of users 114. The determined electronic devices may be an electronically controlled lighting fixture, a handheld mobile device with an in-built display, a speaker, and a wearable haptic device. If the type of emergency is of the first grade, the electronic device 102 may control all four external devices in the external devices 106 to generate sensory feedbacks. The electronic device 102 may control of the electronically controlled lighting fixture to generate the visual feedback. The visual feedback may be caused via a variation of at least one of rate of change of one or more of brightness, color, and color temperature, of ambient lighting, which may be controlled by the electronic device 102. The visual feedback may also be generated via control of the handheld mobile device to display an emergency alert message. Similarly, the electronic device 102 may control the speaker to generate the audio feedback that may be caused by a play-back of an audio version of the emergency alert message. Further, the electronic device 102 may control the wearable haptic device to generate the haptic feedback that may be caused by generation of a force or a vibration.

In accordance with an embodiment, the electronic device 102 may control one or more external devices of the set of external devices 106 to generate a specific type of sensory feedback. The specific type of sensory feedback may be indicated in a received user preference. The electronic device 102 may select the one or more external devices based on determination of the capabilities of the one or more devices to generate the specific type of sensory feedback indicated in the user preference. The electronic device 102 may control the selected one or more external devices to generate the sensory feedback of the specific type to convey an emergency alert. For example, if the electronic device 102 receives a user preference from the user 114A that specifies haptic feedback, the electronic device 102 may control a wearable haptic device in the living environment of the user 114A to generate the haptic feedback.

The EAS messages including emergency alerts may be disseminated through broadcast systems or Internet-based systems. The terrestrial-based broadcast systems have laid down standard guidelines that may allow extension of notifications for emergency alerts using verbal or visual signals. Though the guidelines may facilitate acquisition of information relevant to an emergency alert, most of such information may be required to be accessed from visual signals using electronic devices such as television, display screens, or computer monitors coupled to ATSC-based tuners. However, not all people may have access to the visual information relevant to the emergency alert. For example, sometimes people may be pre-occupied in a task and may not be in a position to visually consume the information on a television or a monitor. Further, people with some kind of disability (for example, visual impairment or hearing impairment) may not be able to hear the emergency alert or view the visual information relevant to the emergency alert. Such people may miss the notifications of the emergency alert. For safety of the users, it may be of importance to ensure that all users have access to the notifications disseminated to the public. Any delay in delivery of the notifications may jeopardize the safety and well-being of the people, especially disabled people.

In order to address issues related to the delivery of notifications of emergency alerts, the disclosed electronic device 102 may operate as a wireless hub to disseminate or share emergency information with external devices (such as, the set of external devices 106) that may be connected to the electronic device 102. The disclosed electronic device 102 may utilize the emergency information to control the connected set of external devices 106. The electronic device 102 may determine capabilities of the set of external devices 106 to generate different types of sensory feedbacks and may control the set of external devices 106 to generate the sensory feedbacks to deliver emergency alerts to the set of users 114. For example, the electronic device 102 may control a wearable haptic device (e.g., the external device 106A) to generate haptic feedback and deliver an emergency notification through the haptic feedback to the user 114A. The haptic feedback may be caused by an application of a vibration on a portion of a user's body that may be in contact with the wearable haptic device. The sensory feedback may facilitate dissemination of the emergency notifications to all users, including users with disabilities. Thus, the emergency notifications may be communicated to a large majority of users including users who may be busy with tasks other than dedicatedly watching TV or users who may have visual or audio impairments.

Figure 2:
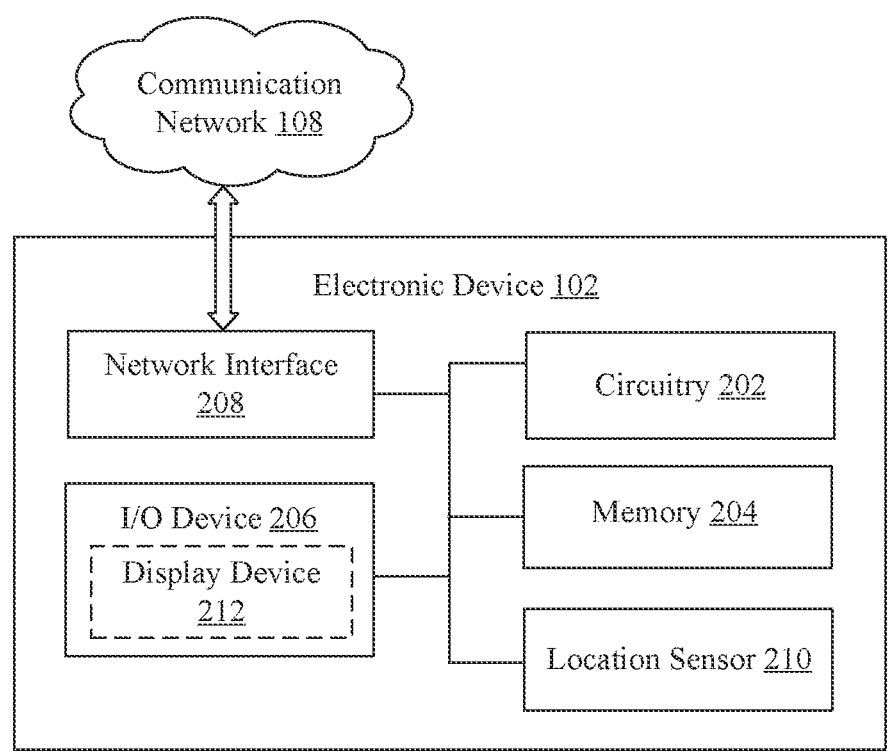
FIG. 2 is a block diagram that illustrates an exemplary electronic device for delivery of extended emergency notifications through sensory feedback, in accordance with an embodiment of the disclosure.

FIG. 2 is a block diagram that illustrates an exemplary electronic device for delivery of extended emergency notifications through sensory feedback, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, a network interface 208, and a location sensor 210. In at least one embodiment, the I/O device 206 may also include a display device 212. The circuitry 202 may be communicatively coupled to the memory 204, the I/O device 206, the network interface 208, and the location sensor 210, through wired or wireless communication of the electronic device 102.

The circuitry 202 may include suitable logic, circuitry, and interfaces that may be configured to execute program instructions associated with different operations to be executed by the electronic device 102. The operations may include reception of a signal from the EAS server 104 that may include one or more of the television broadcast system or the Internet-based system. The operations may further include extraction of emergency information from the received signal. The operations may further include determination of an external device (of the set of external devices 106) that is communicatively coupled to the electronic device 102. The operations may further include the control of the external device to generate a type of sensory feedback that may correspond to an emergency alert. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, interfaces, and/or code that may be configured to store the program instructions to be executed by the circuitry 202. The program instructions stored on the memory 204 may enable the circuitry 202 to execute operations of the circuitry 202 (and/or the electronic device 102). In at least one embodiment, the memory 204 may store information associated with the emergency alert signals such as ATSC 1.0 signals and ATSC 3.0 signals, which may include emergency information and media content. The memory 204 may further store capabilities of each of the set of external devices 106 to generate sensory feedbacks of different types. The memory 204 may further store user preferences that may specify a type of sensory feedback to be generated to deliver an emergency alert to a user. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive user inputs, from the set of users 114, that may indicate user preferences including types of sensory feedback to be generated by the set of external devices 106. The I/O device 206 may render outputs to the set of users 114, which may indicate information associated with an emergency alert. For example, in addition to the generation of the sensory feedback by the set of external devices 106, the I/O device 206 may display a video message of an emergency alert and play-back an audio notification associated with the emergency alert to a user. Examples of the I/O device 206 may include, but are not limited to, a touch screen, a keyboard, a mouse, a joystick, a microphone, the display device 212, and a speaker.

The I/O device 206 may include the display device 212. The display device 212 may include suitable logic, circuitry, and interfaces that may be configured to receive inputs from the circuitry 202 to render, on a display screen, an emergency alert based on the received emergency alert signal 110 (such as ATSC 1.0 signal and ATSC 3.0 signal). The display device 212 may render the emergency alert based on extraction, by the circuitry 202, of the ATSC 1.0 signal and ATSC 3.0 signal, from the ATSC 1.0 tuner or the ATSC 3.0 tuner (coupled to the electronic device 102) respectively. The display device 212 or the display screen may be realized through several known technologies such as, but not limited to, at least one of a Liquid Crystal Display (LCD) display, a Light Emitting Diode (LED) display, a plasma display, or an Organic LED (OLED) display technology, or other display devices.

The network interface 208 may include suitable logic, circuitry, and interfaces that may be configured to facilitate a communication between the circuitry 202, the EAS server 104, and the set of external devices 106, via the communication network 108. The network interface 208 may be implemented by use of various known technologies to support wired or wireless communication of the electronic device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, or a wireless network, such as a cellular telephone network, a wireless local area network (LAN), a short-range communication network, and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, and a wireless pear-to-pear protocol.

The location sensor 210 may include suitable logic, circuitry, and/or interfaces that may be configured to determine a current geo-location of the electronic device 102 and the set of external devices 106. Examples of the location sensor 210, may include, but are not limited to, a Global Navigation Satellite System (GNSS)-based sensor of the electronic device 102. Examples of the GNSS-based sensor may include, but are not limited to, global positioning sensor (GPS), Global Navigation Satellite System (GLONASS), or other regional navigation systems or sensors.

The functions or operations executed by the electronic device 102, as described in FIG. 1, may be performed by the circuitry 202. Operations executed by the circuitry 202 are described in detail, for example, in FIGS. 3, 4, 5A, 5B, and 6.

Figure 3:
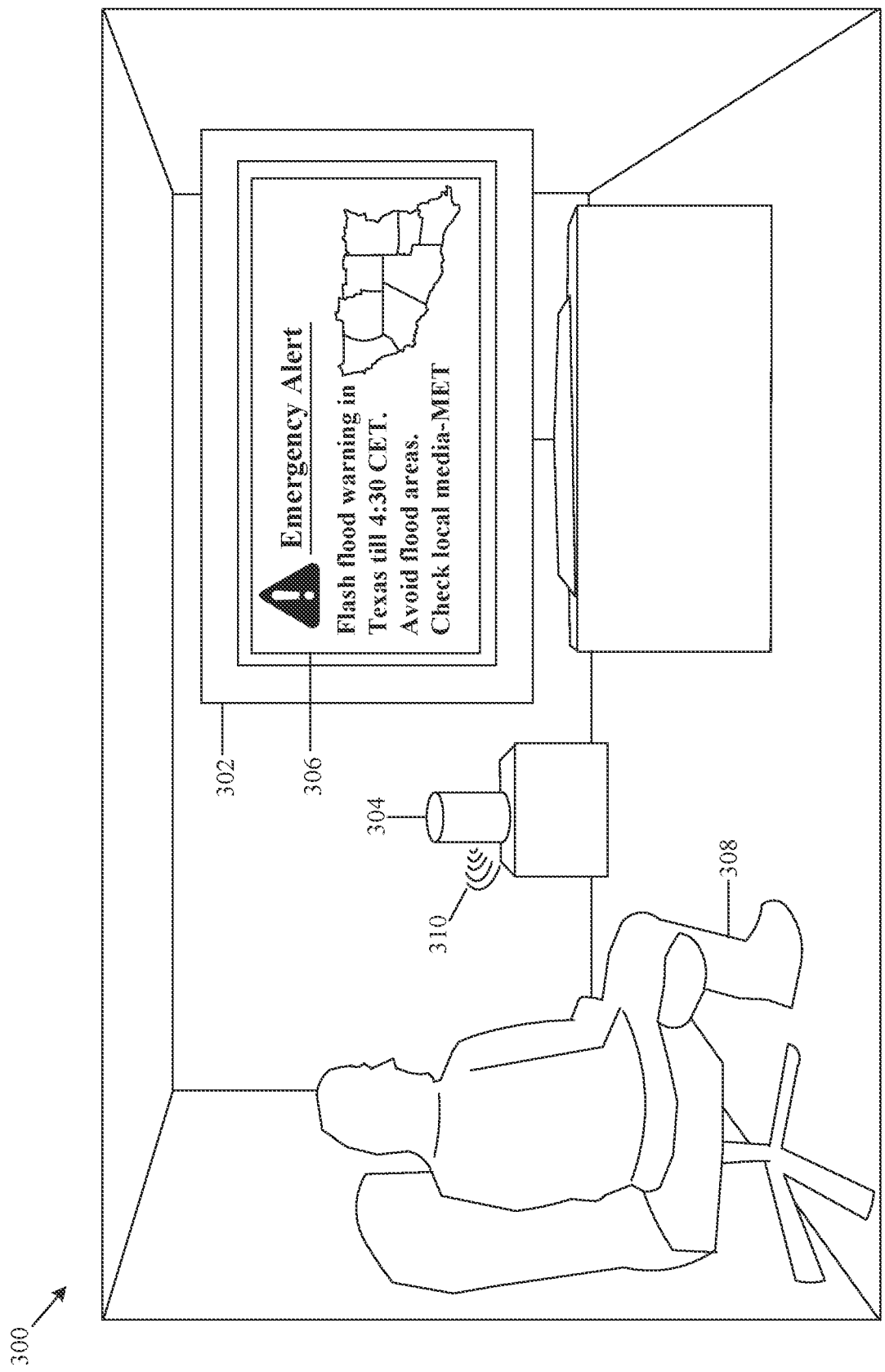
FIG. 3 is a diagram that illustrates an exemplary environment for generation of an audio feedback for delivery of an emergency alert, in accordance with an embodiment of the disclosure.

FIG. 3 is a diagram that illustrates an exemplary environment for generation of an audio feedback for delivery of an emergency alert, in accordance with an embodiment of the disclosure. FIG. 3 is explained in conjunction with elements from FIG. 1 and FIG. 2. With reference to FIG. 3, there is shown an exemplary environment 300. The environment 300 may be an indoor environment, such as, a room, which may be used by people to perform various kinds of social, cultural, religious, economic, or political activities. Examples of the environment 300 may include, but are not limited to, a residential space (such as an apartment or a house), a commercial space (such as an office space, a hotel room, an industrial space, or a concert hall), or a particular room or space in a residential space or a commercial space. In the exemplary environment 300, there is shown an electronic device 302 (for example, a television). The electronic device 302 may be an exemplary implementation of the electronic device 102. Therefore, functionalities of the electronic device 302 may be identical to that of the electronic device 102 of FIG. 1 or FIG. 2. There is further shown an external device 304 (for example, a speaker). The functionalities of the external device 304 may be similar to an external device of the set of external devices 106 of FIG. 1. The electronic device 302 may render an emergency alert 306. There is further shown a user 308 in the environment 300. The user 308 may be a user of the set of users 114, shown in FIG. 1.

The circuitry 202 may be configured to receive a signal (for example, an ATSC 1.0 signal or an ATSC 3.0 signal) from the EAS server 104. In some embodiments, the electronic device 302 may receive the ATSC 1.0 signal via an ATSC 1.0 tuner or the ATSC 3.0 signal via an ATSC 3.0 tuner. The ATSC 1.0 tuner or the ATSC 3.0 tuner may be coupled to the electronic device 302. The circuitry 202 may be further configured to extract emergency information from the ATSC 1.0 signal or the ATSC 3.0 signal. The emergency information may include the emergency alert 306. For example, the emergency alert 306 may include at least one of an emergency text and media content (for example, an image). The circuitry 202 may be further configured to render the emergency text and the media content on a display screen of the electronic device 302.

The circuitry 202 may be further configured to determine the external device 304 that may be communicatively coupled to the electronic device 302. In accordance with an embodiment, the circuitry 202 may further determine capability information of the external device 304, based on the determination of the external device 304. The capability information may correspond to a type of sensory feedback that the external device 304 may be capable or configured to generate. The circuitry 202 may determine, based on the capability information, that the external device 304 may be configured to generate an audio feedback. For example, the external device 304 (e.g., the speaker) may have a capability to provide an audio output as the audio feedback. The circuitry 202 may be configured to determine capability information of other external devices (in the environment 300) that may correspond to types of sensory feedback that the other external devices are configured to generate.

In accordance with an embodiment, the circuitry 202 may be further configured to receive a user preference that may specify the type of sensory feedback to be generated for delivery of the emergency alert 306 through the external device 304. In an example, the user preference may be received from the user 308, based on the determination of the external device 304. The circuitry 202 may determine, based on the user preference, that audio feedback is specified as the type of sensory feedback preferred by the user 308. The circuitry 202 may determine that an audio feedback may be required to be generated to deliver emergency alerts through the external device 304. The circuitry 202 may be further configured to receive other user preferences (from the user 308) that may specify types of sensory feedbacks to be generated for delivery of the emergency alert 306 through the other external devices (in the environment 300).

The extracted emergency information may further include the type of sensory feedback to be generated via an external device. In accordance with an embodiment, the circuitry 202 may determine whether the type of sensory feedback, included in the extracted emergency information, is an audio feedback. For example, in case the emergency information corresponds to a tsunami warning, the emergency information may indicate that an appropriate type of sensory feedback for the emergency information may be the audio feedback.

The circuitry 202 may be further configured to control the external device 304 to generate a type of sensory feedback that may correspond to the emergency alert 306. The circuitry 202 may control the external device 304 to generate a sensory feedback (for example, an audio feedback 310) to deliver the emergency alert 306 to the user 308. The audio feedback may be rendered as a sound alert or an audio play-back of audio content included in the emergency alert 306. The audio feedback 310 may draw an attention of the user 308 to the emergency alert 306 that may be rendered on a display screen of the electronic device 302. The audio feedback 310 may be useful for the user 308 in scenarios where the user 308 is visually challenged or is unable to view the rendered emergency alert 306. The external device 304 may be configured (based on a user input from the user 308) to provide the audio feedback 310 in an event of an emergency. Thus, the generation of the audio feedback 310 by the external device 304 may indicate to the visibly challenged user 308 that there may be an emergency.

The circuitry 202 may control the external device 304 to generate a sensory feedback based on at least one of the determined capability of the external device 304, the user preference received from the user 308, or the extracted emergency information. In accordance with an embodiment, the circuitry 202 may control the external device 304 to generate the audio feedback 310 based on the determination that the external device 304 may be capable to generate the audio feedback. In accordance with an embodiment, the circuitry 202 may control the external device 304 to generate the audio feedback 310 based on a determination of a type of sensory feedback (the audio feedback 310) specified in the user preference received from the user 308.

In accordance with an embodiment, the circuitry 202 may control the external device 304 to generate the audio feedback 310 if audio feedback is included as the type of sensory feedback in the extracted emergency information. If the type of sensory feedback in the extracted emergency information is not audio feedback, the circuitry 202 may be configured to determine an external device that may have the capability to generate the specific type of sensory feedback included in the extracted emergency information. It should be noted that the environment 300 of FIG. 3 is for exemplary purposes and should not be construed to limit the scope of the disclosure.

Figure 4:
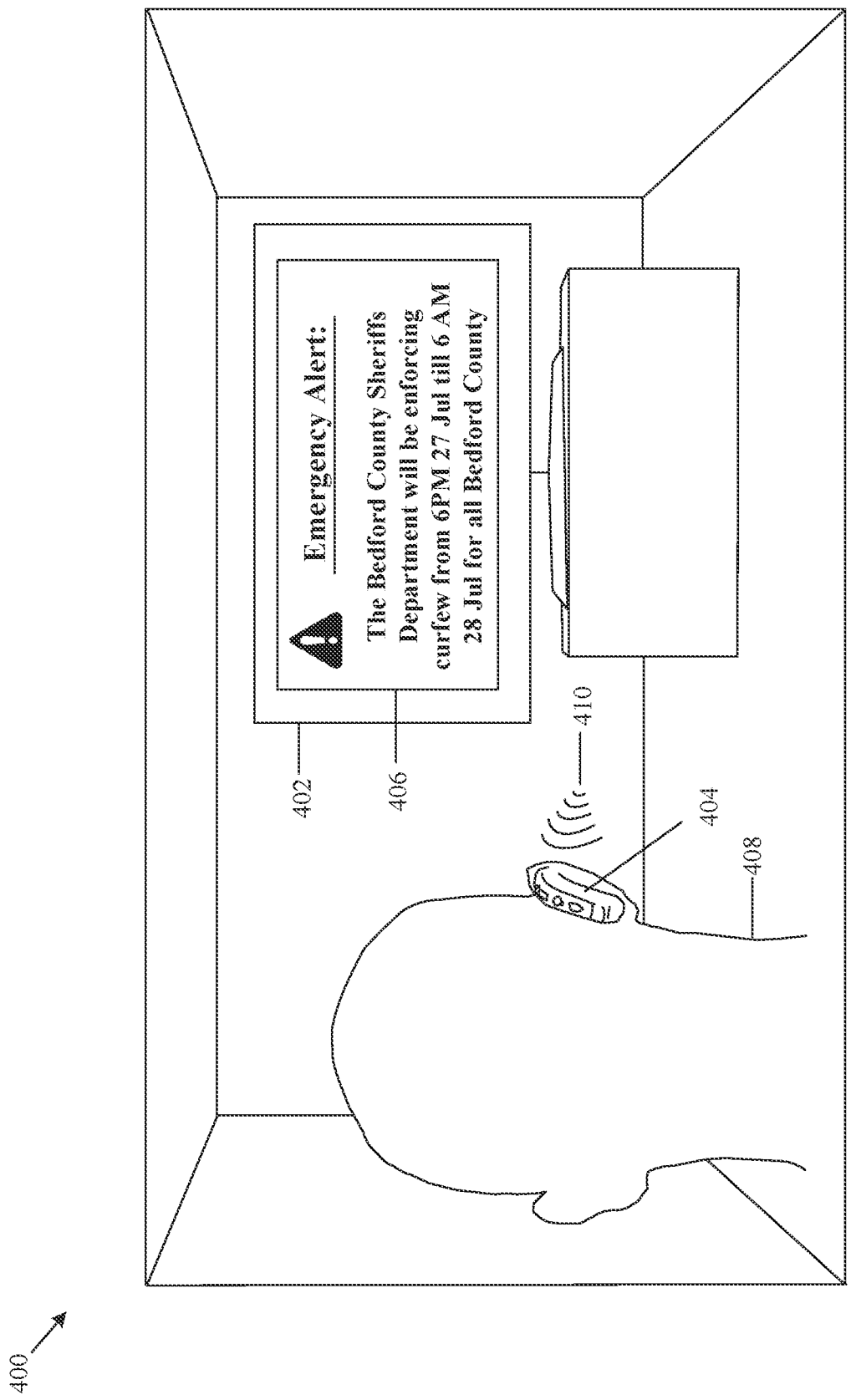
FIG. 4 is a diagram that illustrates an exemplary environment for generation of an audio feedback for delivery of an emergency alert, in accordance with an embodiment of the disclosure.

FIG. 4 is a diagram that illustrates an exemplary environment for generation of an audio feedback for delivery of an emergency alert, in accordance with an embodiment of the disclosure. FIG. 4 is explained in conjunction with elements from FIG. 1, FIG. 2, and FIG. 3. With reference to FIG. 4, there is shown an exemplary environment 400. In the exemplary environment 400, there is shown an electronic device 402 (for example, a television). The electronic device 402 may be an exemplary implementation of the electronic device 102. Therefore, functionalities of the electronic device 402 may be identical to the electronic device 102 of FIG. 1 or FIG. 2. There is further shown an external device 404 (for example, a hearing aid). The functionalities of the external device 404 may be similar to an external device of the set of external devices 106 of FIG. 1. The electronic device 402 may render an emergency alert 406. There is further shown a user 408 in the environment 400. The user 408 may be a user of the set of users 114 shown in FIG. 1. The circuitry 202 may be configured to control the external device 404 to generate an audio feedback 410 to deliver the emergency alert 406. The control of the external device 404 may be based on a determination that the audio feedback may be the type of sensory feedback to be generated through the external device 404.

The circuitry 202 may be configured to receive a signal (for example, an ATSC 1.0 signal or an ATSC 3.0 signal) from the EAS server 104. The circuitry 202 may be further configured to extract emergency information from the received signal. The emergency information may include the emergency alert 406. The circuitry 202 may be further configured to render the emergency alert 406 on a display screen of the electronic device 402.

The circuitry 202 may be further configured to determine the external device 404 that may be communicatively coupled to the electronic device 402. In accordance with an embodiment, the circuitry 202 may further determine capability information of the external device 404, based on the determination of the external device 404. The circuitry 202 may determine, based on the capability information, that the external device 404 may be configured to generate the audio feedback. For example, the external device 404 (e.g., the hearing aid) may have a capability to provide an audio output as the audio feedback.

In accordance with an embodiment, the circuitry 202 may be further configured to receive a user preference that may specify the type of sensory feedback to be generated for delivery of the emergency alert 406 through the external device 404. The user preference may be received from the user 408, based on the determination of the external device 404. The circuitry 202 may determine, based on the user preference, that the audio feedback may be specified as the type of sensory feedback. Thus, the circuitry 202 may control the external device 404 to generate the audio feedback 410 to deliver emergency alerts through the external device 404.

The extracted emergency information may further include the type of sensory feedback to be generated via an external device. In accordance with an embodiment, the circuitry 202 may determine whether the type of sensory feedback, included in the extracted emergency information, is an audio feedback. For example, in case the emergency information corresponds to a tsunami warning, the emergency information may indicate that an appropriate type of sensory feedback for the emergency information may be an audio feedback.

The circuitry 202 may be further configured to control the external device 404 to generate a type of sensory feedback that corresponds to the emergency alert 406. The circuitry 202 may control the external device 404 to generate a sensory feedback (for example, the audio feedback 410) to convey the emergency alert 406 to the user 408. The audio feedback may be delivered by a play-back of a sound alert or an audio content included in the emergency alert 406. The audio feedback 410 may draw the attention of the user 408 to the emergency alert 406 rendered on the display screen of the electronic device 402. The audio feedback 410 may correspond to the emergency alert 406 for the user 408, particularly if the user 408 has a hearing disability or if the user 408 is partially deaf. The user 408 may configure the external device 404 to provide the audio feedback 410 in an event of an emergency. Therefore, generation of the audio feedback 410 by the external device 404 may notify the user 408 with the hearing disability, of an occurrence of an emergency.

The circuitry 202 may control the external device 404 to generate a sensory feedback based on at least one of the determined capability of the external device 404, the user preference received from the user 408, or the extracted emergency information. In accordance with an embodiment, the circuitry 202 may control the external device 404 to generate the audio feedback 410 based on the determination of the capability of the external device 404 to generate the audio feedback. In accordance with an embodiment, the circuitry 202 may control the external device 404 to generate the audio feedback 410 based on the type of sensory feedback (the audio feedback 410) indicated in the user preference received from the user 408. In accordance with an embodiment, the circuitry 202 may control the external device 404 to generate the audio feedback 410 if the audio feedback is included as the type of sensory feedback in the extracted emergency information. It should be noted that the environment 400 of FIG. 4 is for exemplary purposes and should not be construed to limit the scope of the disclosure.

Figure 5:
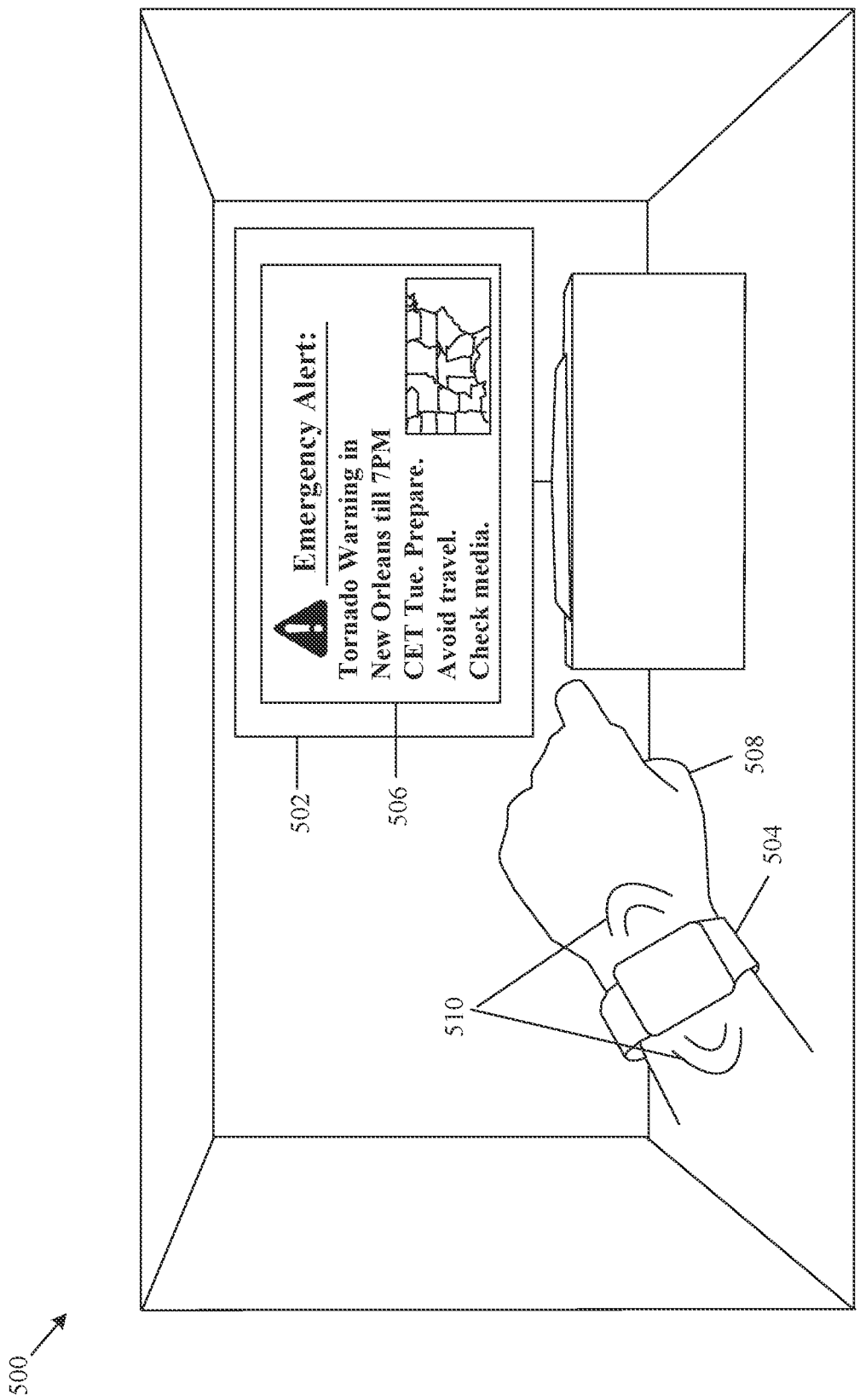
FIG. 5 is a diagram that illustrates an exemplary environment for generation of a haptic feedback for delivery of an emergency alert, in accordance with an embodiment of the disclosure.

FIG. 5 is a diagram that illustrates an exemplary environment for generation of a haptic feedback for delivery of an emergency alert, in accordance with an embodiment of the disclosure. FIG. 5 is explained in conjunction with elements from FIG. 1, FIG. 2, FIG. 3, and FIG. 4. With reference to FIG. 5, there is shown an exemplary environment 500. In the exemplary environment 500, there is shown an electronic device 502 (for example, a television). The electronic device 502 may be an exemplary implementation of the electronic device 102. Therefore, functionalities of the electronic device 502 may be identical to the electronic device 102 of FIG. 1 or FIG. 2. There is further shown an external device 504 (for example, a wearable haptic device, such as, a smart watch or a smart band). The functionalities of the external device 504 may be similar to an external device of the set of external devices 106 of FIG. 1. The electronic device 502 may render an emergency alert 506. There is further shown a user 508 in the environment 500. The user 508 may be a user of the set of users 114 shown in FIG. 1. The circuitry 202 may be configured to control the external device 504 to generate a haptic feedback 510 to convey the emergency alert 506. The control of the external device 504 may be based on a determination that a haptic feedback may be an appropriate type of sensory feedback to be generated through the external device 504.

The circuitry 202 may be configured to receive a signal (for example, an ATSC 1.0 signal or an ATSC 3.0 signal) from the EAS server 104. The circuitry 202 may be further configured to extract emergency information from the received signal. The emergency information may include the emergency alert 506. The circuitry 202 may be configured to extract the emergency alert 506 from the received signal. The emergency alert 506 may include a text message that may signify an emergency condition. The emergency alert 506 may further include media content (for example, an image). The media content may highlight location(s) that may be affected by the emergency condition. The circuitry 202 may be configured to render the emergency alert 506 on a display screen of the electronic device 502.

The circuitry 202 may be further configured to determine the external device 504 that may be communicatively coupled to the electronic device 502. In accordance with an embodiment, the circuitry 202 may further determine capability information of the external device 504, based on the determination of the external device 504. The circuitry 202 may determine, based on the capability information, that the external device 504 may be configured to generate the haptic feedback. For example, the external device 504 may have a capability to provide a haptic or tactile output to a user to deliver the haptic feedback.

In accordance with an embodiment, the circuitry 202 may be further configured to receive a user preference that may specify the type of sensory feedback to be generated for delivery of the emergency alert 506, through the external device 504. The user preference may be received from the user 508, based on the determination of the external device 504. The circuitry 202 may determine, based on the user preference, that haptic feedback may be specified as the type of sensory feedback.

The extracted emergency information may further include the type of sensory feedback to be generated via an external device. In accordance with an embodiment, the circuitry 202 may determine whether the type of sensory feedback, included in the extracted emergency information, is haptic feedback. For example, in case the emergency information corresponds to a flash-flood warning, the emergency information may indicate that an appropriate type of sensory feedback for the emergency information may be a haptic feedback.

The circuitry 202 may be further configured to control the external device 504 to generate a type of sensory feedback that may correspond to the emergency alert 506. The circuitry 202 may control the external device 504 to generate a sensory feedback (for example, the haptic feedback 510) to deliver the emergency alert 506 to the user 508. The haptic feedback 510 may draw the attention of the user 508 to the emergency alert 506 rendered on the display screen of the electronic device 502. The haptic feedback 510 may create an experience of a tactile sensation for the user 508, via an application of force or vibration on a hand of the user 508. In an example, the haptic feedback 510 may correspond to the emergency alert 506 for the user 508, if the user 408 has a visual or hearing impairment. The user 508 may configure the external device 504 to provide the haptic feedback 510 in the event of an emergency. Therefore, generation of the haptic feedback 510 by the external device 504 may notify the visual or hearing-impaired user 508, of an occurrence of an emergency.

The circuitry 202 may control the external device 504 to generate a sensory feedback based on at least one of the determined capability of the external device 504, the user preference received from the user 508, or the extracted emergency information. In accordance with an embodiment, the circuitry 202 may control the external device 504 to generate the haptic feedback 510 based on the determination of the capability of the external device 504 to generate the haptic feedback. In accordance with an embodiment, the circuitry 202 may control the external device 404 to generate the haptic feedback 510 based on the type of sensory feedback (the haptic feedback 510) specified in the user preference received from the user 508. In accordance with an embodiment, the circuitry 202 may control the external device 504 to generate the haptic feedback 510 if the haptic feedback is included as the type of sensory feedback in the extracted emergency information. It should be noted that the environment 500 of FIG. 5 is for exemplary purposes and should not be construed to limit the scope of the disclosure.

Figure 6A:
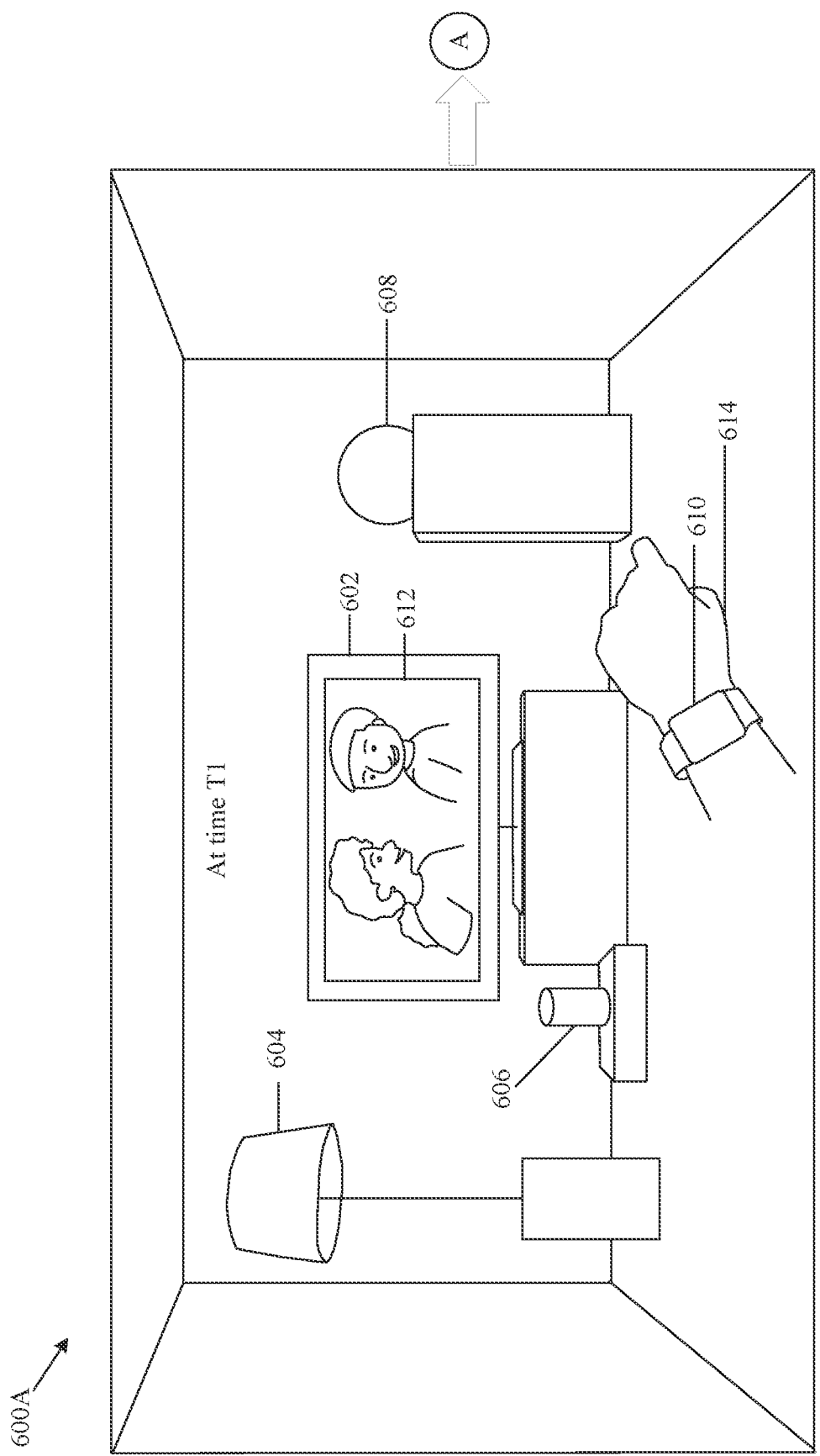
FIG. 6A is a diagram that illustrates an exemplary environment that includes external devices for generation of sensory feedbacks for delivery of an emergency alert, in accordance with an embodiment of the disclosure.

FIG. 6A is a diagram that illustrates an exemplary environment that includes external devices for generation of sensory feedbacks for delivery of an emergency alert, in accordance with an embodiment of the disclosure. FIG. 6A is explained in conjunction with elements from FIG. 1, FIG. 2, FIG. 3, FIG. 4, and FIG. 5. With reference to FIG. 6A, there is shown exemplary environment 600. In the exemplary environment 600, there is shown an electronic device 602 (for example, a television). The electronic device 602 may be an exemplary implement of the electronic device 602. Therefore, functionalities of the electronic device 602 may be identical to the electronic device 102 of FIG. 1 or FIG. 2. There is further shown an external device 604 (for example, a first electronically controlled lighting-fixture), an external device 606 (for example, a speaker), an external device 608 (for example, a second electronically controlled lighting-fixture), and an external device 610 (for example, a wearable haptic device, such as, a smart watch). The functionalities of the external device 604, the external device 606, the external device 608, and the external device 610, may be similar to external devices of the set of external devices 106 of FIG. 1. At a time instant T1, the circuitry 202 may be configured to render media content 612 on a display screen of the electronic device 602. There is further shown a user 614 in the living environment 600. The user 614 may be a user of the set of users 114 shown in FIG. 1.

Figure 6B:
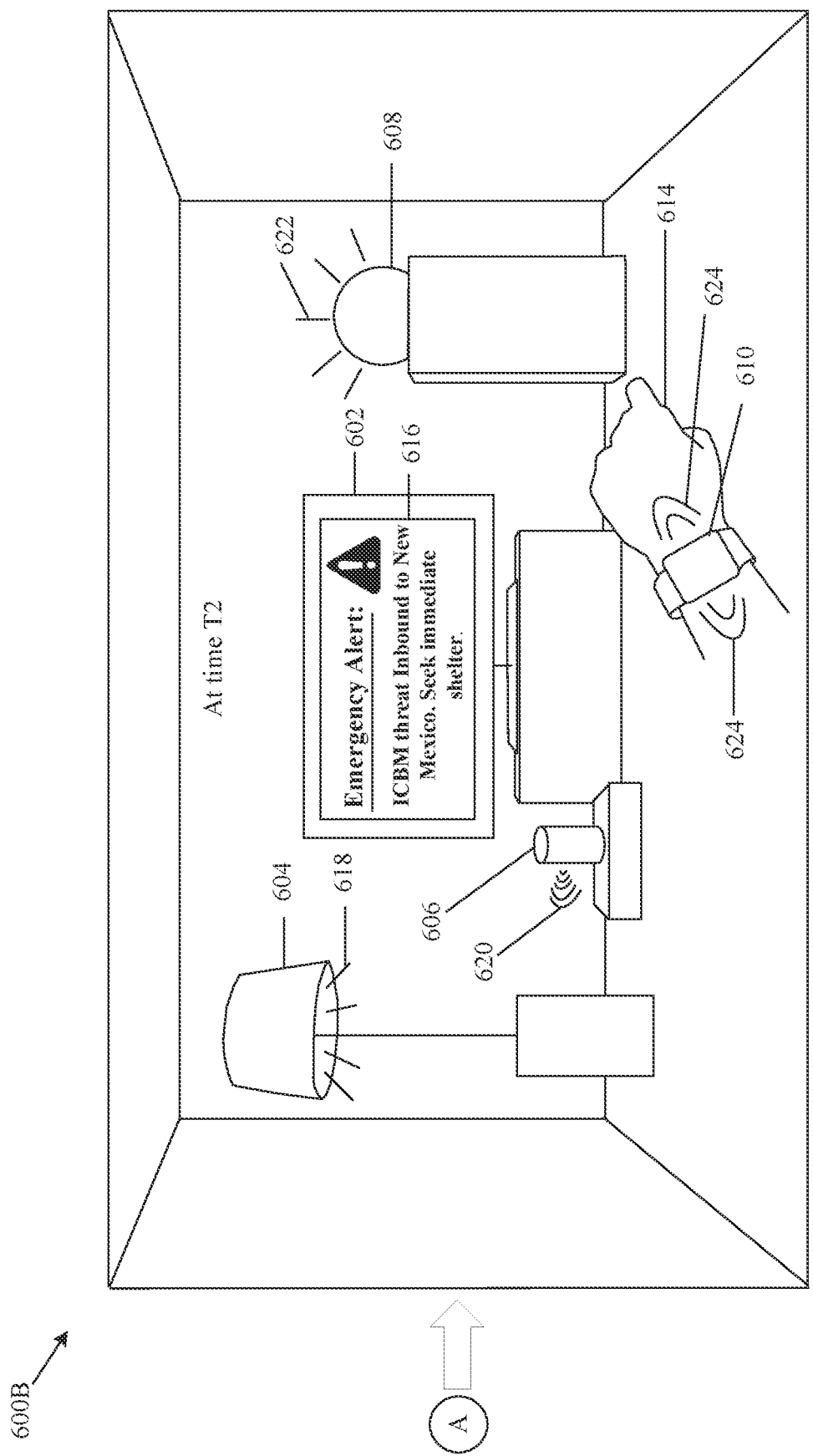
FIG. 6B is a diagram that illustrates the exemplary environment for generation of different types of sensory feedbacks based on a type of emergency associated with an emergency alert, in accordance with an embodiment of the disclosure.

FIG. 6B is a diagram that illustrates the exemplary environment for generation of different types of sensory feedbacks based on a type of emergency associated with an emergency alert, in accordance with an embodiment of the disclosure. FIG. 6B is explained in conjunction with elements from FIG. 1, FIG. 2, FIG. 3, FIG. 4, FIG. 5, and FIG. 6A. With reference to FIG. 6B, there is shown the exemplary environment 600. In the exemplary environment 600, there is shown the electronic device 602, the external device 604, the external device 606, the external device 608, and the external device 610. At a time instant T2, the circuitry 202 may be configured to render an emergency alert 616 on a display screen of the electronic device 602. The circuitry 202 may be configured to control the external device 604, the external device 606, the external device 608, and the external device 610, to generate different types of sensory feedbacks to deliver the emergency alert 616 based on the type of the emergency alert 616.

The circuitry 202 may be configured to receive a signal (for example, an ATSC 1.0 signal or an ATSC 3.0 signal) from the EAS server 104. The circuitry 202 may be further configured to obtain the emergency alert 616, via an extraction of the emergency alert 616 from the received signal. Thereafter, the circuitry 202 may render the emergency alert 616 on a display screen of the electronic device 602. The circuitry 202 may be further configured to determine that the external device 604, the external device 606, the external device 608, and the external device 610, may be communicatively coupled to the electronic device 602.

In accordance with an embodiment, the circuitry 202 may further determine capability information of each of the external device 604, the external device 606, the external device 608, and the external device 610. The circuitry 202 may determine, based on the capability information, that the external device 604 may be configured to generate a visual feedback. Further, based on the capability information, the circuitry 202 may determine that the external device 606 may be configured to generate an audio feedback, the external device 608 may be configured to generate a visual feedback, and the external device 610 may be configured to generate a haptic feedback.

In accordance with an embodiment, the circuitry 202 may be further configured to receive a user preference that may specify the type of sensory feedback to be generated for delivery of the emergency alert 616, through each of the external device 604, the external device 606, the external device 608, and the external device 610. For example, the circuitry 202 may determine, based on user preference corresponding to the external device 604, that the haptic feedback may be specified as the type of sensory feedback. Similarly, the circuitry 202 may determine that audio feedback, visual feedback, and haptic feedback, may be specified as types of sensory feedbacks in the received user preferences corresponding to the external device 606, external device 608, and external device 610, respectively.

The circuitry 202 may be further configured to determine a type of emergency based on extraction of emergency information from the received ATSC 1.0 signal or an ATSC 3.0 signal. The type of emergency corresponding to the emergency alert 616 may be of the first grade, where the type of emergency may vary from the first grade to the fifth grade. The type of emergency may indicate that severity of the emergency alert 616 may be the highest. The indication of the type of emergency may be included, in the received ATSC 1.0 signal or an ATSC 3.0 signal, by the EAS server 104 based on a location of the electronic device 602 and external devices (the external device 604, the external device 606, the external device 608, and the external device 610). Herein, the circuitry 202 may be configured to determine the location of the electronic device 602 and the external devices. Further, the circuitry 202 may transmit the determined location to the EAS server 104. Based on the location, the EAS server 104 may include the indication associated with the type or severity of the emergency in the emergency information.

In accordance with an embodiment, the circuitry 202 may be configured to select at least one external device amongst the external device 604, the external device 606, the external device 608, and the external device 610, to generate at least one type of sensory feedback. The at least one sensory feedback may deliver the emergency alert 616. For example, in case, the type of emergency is of the first grade, the circuitry 202 may select all the determined external devices, i.e., external device 604, the external device 606, the external device 608, and the external device 610, to deliver the emergency alert 616. It may be noted that the circuitry 202 may be configured to select either a single external device, two external devices, or three external devices, based on whether the determined type of emergency (indicated in the received ATSC 1.0 signal or an ATSC 3.0 signal) is of first grade, second grade, third grade, or the fourth grade. In certain cases, the selection may depend on whether the type of sensory feedback generated by the external device may be able to alert the user 614.

The circuitry 202 may be further configured to control the selected external devices (the external device 604, the external device 606, the external device 608, and the external device 610) to generate different types of sensory feedbacks. For example, the circuitry 202 may control the external device 604 (for example, the first electronically controlled lighting-fixture) to generate a visual feedback 618. Similarly, the circuitry 202 may control the external device 606 (for example, the speaker), the external device 608 (for example, the second electronically controlled lighting-fixture), and the external device 610 (for example, the wearable haptic device), to generate an audio feedback 620, a visual feedback 622, and a haptic feedback 624, respectively. The generated audio feedback 620, the generated visual feedback 622, and the generated haptic feedback 624 may deliver the emergency alert 616 of the first grade to the user 614. In some embodiments, the circuitry 202 may synchronize the control of generation of the visual feedback 618, the audio feedback 620, the visual feedback 622, and haptic feedback 624, through the external device 604, the external device 606, the external device 608, and the external device 610, respectively. The synchronous generation of the different types of sensory feedbacks may draw the attention of the user 614 to the emergency alert 616 and indicate occurrence of a severe category emergency that may require an immediate response from the user 614.

The circuitry 202 may be configured to control the external device 604 and the external device 608 to change at least one of color, brightness, color temperature; or rate of change of color, brightness, or color temperature of the external device 604 and the external device 608. The at least one change may lead to the generation of the visual feedback 618 and the visual feedback 622. The circuitry 202 may be configured to control the external device 606 to play-back a sound alert or a play-back audio content associated with the emergency alert 616. The play-back of the sound alert or the audio content associated with the emergency alert 616 may lead to the generation of the audio feedback 620. Similarly, the circuitry 202 may be configured to control the external device 610 to generate a force or vibration that may create an experience of a tactile sensation for the user 614. The generation of the force or vibration may lead to the generation of the haptic feedback 624. The generated visual feedback 618, the generated audio feedback 620, the generated visual feedback 622, and/or the haptic feedback 624, may alert the user 614 even in case where the user 614 has visual or hearing impairment. It should be noted that the environment 600A and 600B of FIGS. 6A and 6B, respectively, are for exemplary purposes and should not be construed to limit the scope of the disclosure.

Figure 7:
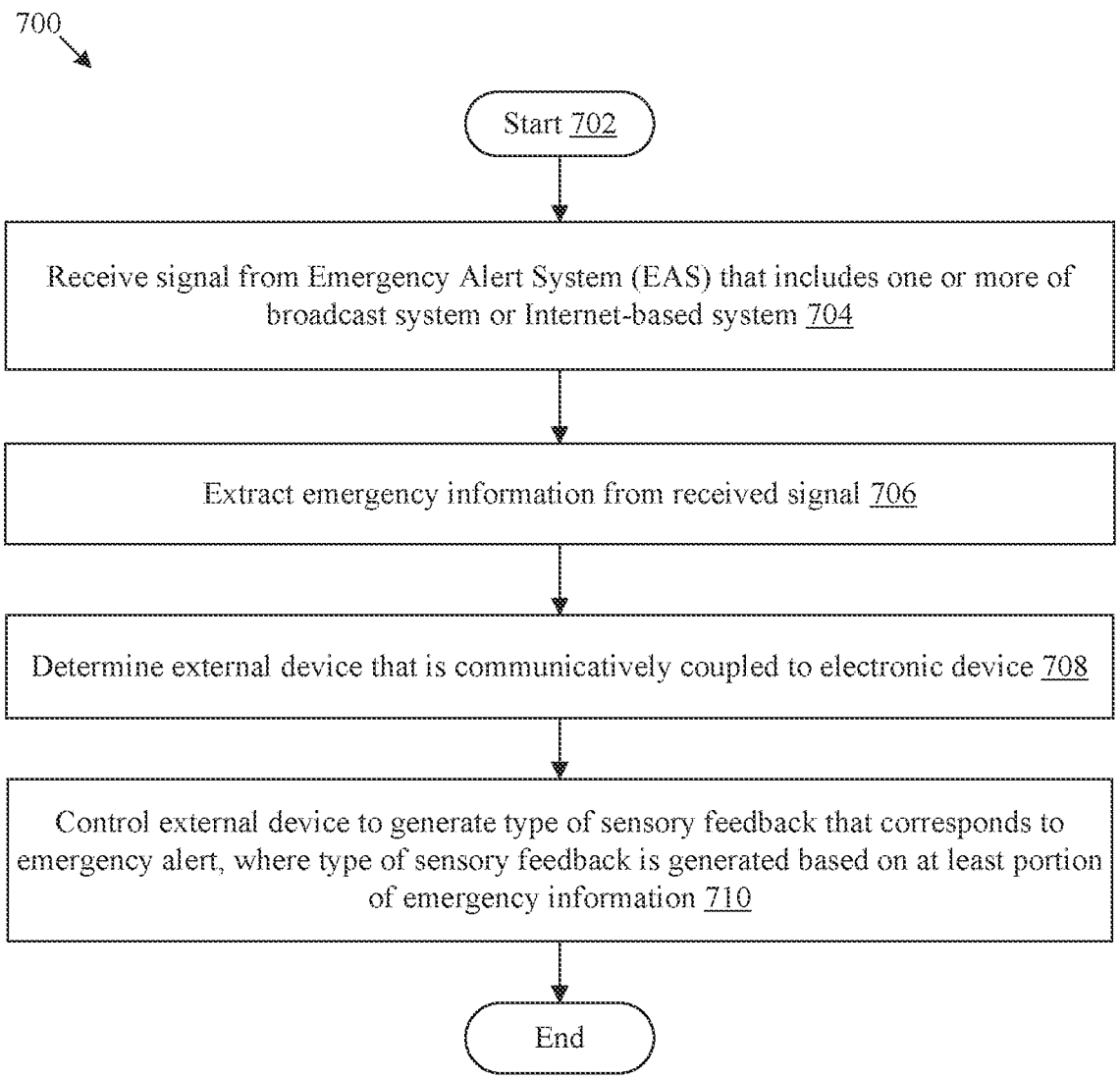
FIG. 7 is a flowchart that illustrates operations for an exemplary method for delivery of extended emergency notifications through sensory feedback, in accordance with an embodiment of the disclosure.

FIG. 7 is a flowchart that illustrates operations for an exemplary method for delivery of extended emergency notifications through sensory feedback, in accordance with an embodiment of the disclosure. FIG. 7 is explained in conjunction with elements from FIGS. 1, 2, 3, 4, 5, 6A, and 6B. With reference to FIG. 7, there is shown a flowchart 700. The operations from 702 to 710 may be implemented by any computing system, such as, by the electronic device 102 of FIG. 1. The operations may start at 702 and may proceed to 704.

At 704, a signal may be received from the Emergency Alert System (EAS) (e.g., the EAS server 104) that may include one or more of a broadcast system or an Internet-based system. In at least one embodiment, the circuitry 202 may be configured to receive the signal from the EAS (e.g., the EAS server 104) that may include one or more of the broadcast system or the Internet-based system. The details of reception of the signal from the EAS server 104, are described, for example, in FIG. 1.

At 706, emergency information may be extracted from the received signal. In at least one embodiment, the circuitry 202 may be configured to extract the emergency information from the received signal (for example, the ATSC 1.0 signal or the ATSC 3.0 signal). The details of the extraction of the emergency information are described, for example, in FIG. 1.

At 708, an external device, that may be communicatively coupled to the electronic device 102, may be determined. In at least one embodiment, the circuitry 202 may be configured to determine the external device (for example, the external device 106A), that may be communicatively coupled to the electronic device 102. The details of determination of the external device, are described, for example, in FIG. 1.

At 710, the external device may be controlled to generate a type of sensory feedback that may correspond to an emergency alert. In at least one embodiment, the circuitry 202 may be configured to control the external device (for example, the external device 106A) to generate the type of sensory feedback (for example, the audio feedback 310) that may correspond to the emergency alert (for example, the emergency alert 306). The type of sensory feedback may be generated based on at least a portion of the extracted emergency information. The control of the external device to generate the type of sensory feedback corresponding to the emergency alert is described further, for example, in FIGS. 1, 3, 4, 5, 6A, and 6B. Control may pass to end.

Although the flowchart 700 is illustrated as discrete operations, such as 704, 706, 708, and 710 the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (such as the electronic device 102). The computer-executable instructions may cause the machine and/or computer to perform operations that include reception of a signal from an EAS server 104 that may include one or more of a broadcast system or an Internet-based system. The operations may further include extraction of emergency information from the received signal. The operations may further include determination of an external device (such as, the external device 106A, . . . 106N) that may be communicatively coupled to the electronic device 102. The operations may further include control of the external device to generate a type of sensory feedback that may correspond to an emergency alert. The type of sensory feedback may be generated based on at least a portion of the emergency information.

Exemplary aspects of the disclosure may include an electronic device (such as, the electronic device 102 of FIG. 1) that may include circuitry (such as, the circuitry 202), that may be communicatively coupled to one or more external devices (such as, the one or more external devices 106A . . . 106N, of FIG. 1). The electronic device 102 may further include memory (such as, the memory 204 of FIG. 2). The circuitry 202 may be configured to receive a signal from an Emergency Alert System (EAS) (such as, the EAS server 104) that may include one or more of a broadcast system or an Internet-based system. The signal may be either an ATSC 1.0 signal or an ATSC 3.0 signal that may include the emergency information and media content. The circuitry 202 may be further configured to extract emergency information from the received signal. The circuitry 202 may be further configured to determine an external device (such as, the external device 106A, . . . 106N) that may be communicatively coupled to the electronic device 102. The external device may correspond to one of an electronically controlled lighting fixture, a handheld mobile device with an in-built display, a wearable or head-mounted display, a television remote, a voice-command device with an integrated virtual assistant, a wearable haptic device, or a handsfree device. The circuitry 202 may be further configured to control the external device to generate a type of sensory feedback that may correspond to an emergency alert.

The type of sensory feedback may include one or more of a visual feedback that may be caused by a change in a color of ambient lighting, a visual feedback that may be caused by a change in a brightness of ambient lighting, a visual feedback that may be caused by a change in a color temperature of ambient lighting, a visual feedback that may be caused by a rate of the change in the brightness, the color, or the color temperature, a haptic feedback, a somatosensory feedback that may emulate a sense of cold or warmth, or a somatosensory feedback that may emulate a sense of tactile touch. The type of sensory feedback may be generated based on at least a portion of the emergency information. The type of sensory feedback may be specified in the portion of the emergency information.

In accordance with an embodiment, the circuitry 202 may be configured to determine capability information of the external device that may be communicatively coupled to the electronic device 102. The circuitry 202 may be further configured to determine the type of sensory feedback to be generated by the external device, based on the capability information.

In accordance with an embodiment, the circuitry 202 may be further configured to receive a user preference that may specify the type of sensory feedback to be generated for the emergency alert. The type of sensory feedback may be generated further based on the user preference.

In accordance with an embodiment, the circuitry 202 may be further configured to determine the type of sensory feedback, that is to be generated through the external device, based on a type of emergency associated with the emergency alert.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:
   circuitry configured to:
   receive a signal from an Emergency Alert System (EAS), wherein the EAS includes one or more of a broadcast system or an Internet-based system;
   extract emergency information from the received signal;
   determine an external device that is communicatively coupled to the electronic device; and
   control the external device to generate a type of a sensory feedback that corresponds to an emergency alert of the emergency information, wherein
   the type of the sensory feedback is based on at least a type of emergency associated with the emergency alert.

2. The electronic device according to claim 1, wherein the signal is an Advanced Television Systems Committee (ATSC) 1.0 signal that includes the emergency information and media content.

3. The electronic device according to claim 1, wherein the signal is an Advanced Television Systems Committee (ATSC) 3.0 signal that includes the emergency information and media content.

4. The electronic device according to claim 1, wherein the external device corresponds to one of an electronically controlled lighting fixture, a handheld mobile device with an in-built display, a wearable or head-mounted display, a television remote, a voice-command device with an integrated virtual assistant, a wearable haptic device, or a handsfree device.

5. The electronic device according to claim 1, wherein the circuitry is further configured to:
   determine capability information of the external device that is communicatively coupled to the electronic device; and
   determine the type of the sensory feedback to be generated by the external device, based on the capability information.

6. The electronic device according to claim 1, wherein the circuitry is further configured to receive a user preference that specifies the type of the sensory feedback to be generated for the emergency alert, and
   wherein the type of the sensory feedback is generated further based on the user preference.

7. The electronic device according to claim 1, the type of emergency associated with the emergency alert is specified in the emergency information.

8. The electronic device according to claim 1, wherein the type of the sensory feedback includes one or more of:
   a first visual feedback that is caused by a change in a color of ambient lighting,
   a second visual feedback that is caused by a change in a brightness of ambient lighting,
   a third visual feedback that is caused by a change in a color temperature of ambient lighting,
   a fourth visual feedback that is caused by a rate of the change in the brightness, the color, or the color temperature,
   a haptic feedback,
   a first somatosensory feedback that emulates a sense of cold or warmth, or
   a second somatosensory feedback that emulates a sense of tactile touch.

9. A method, comprising:
   in an electronic device:
   receiving a signal from an Emergency Alert System (EAS), wherein the EAS includes one or more of a broadcast system or an Internet-based system;
   extracting emergency information from the received signal;
   determining an external device that is communicatively coupled to the electronic device; and
   controlling the external device to generate a type of a sensory feedback that corresponds to an emergency alert,
   wherein the type of the sensory feedback is based on at least a type of emergency associated with the emergency alert.

10. The method according to claim 9, wherein the signal is an Advanced Television Systems Committee (ATSC) 1.0 signal that includes the emergency information and media content.

11. The method according to claim 9, wherein the signal is an Advanced Television Systems Committee (ATSC) 3.0 signal that includes the emergency information and media content.

12. The method according to claim 9, wherein the external device corresponds to one of an electronically controlled lighting fixture, a handheld mobile device with an in-built display, a wearable or head-mounted display, a television remote, a voice-command device with an integrated virtual assistant, a wearable haptic device, or a handsfree device.

13. The method according to claim 9, further comprising:
   determining capability information of the external device that is communicatively coupled to the electronic device; and
   determining the type of the sensory feedback to be generated by the external device, based on the capability information.

14. The method according to claim 9, further comprising receiving a user preference that specifies the type of the sensory feedback to be generated for the emergency alert, and wherein the type of the sensory feedback is generated further based on the user preference.

15. The method according to claim 9, wherein the type of emergency associated with the emergency alert is specified in the emergency information.

16. The method according to claim 9, wherein the type of the sensory feedback includes one or more of:
   a first visual feedback that is caused by a change in a color of ambient lighting,
   a second visual feedback that is caused by a change in a brightness of ambient lighting,
   a third visual feedback that is caused by a change in a color temperature of ambient lighting,
   a fourth visual feedback that is caused by a rate of the change in the brightness, the color, or the color temperature,
   a haptic feedback,
   a first somatosensory feedback that emulates a sense of cold or warmth, or
   a second somatosensory feedback that emulates a sense of tactile touch.

17. A non-transitory computer-readable medium having stored thereon, computer-executable instructions that when executed by an electronic device, causes the electronic device to execute operations, the operations comprising:

receiving a signal from an Emergency Alert System (EAS), wherein the EAS includes one or more of a broadcast system or an Internet-based system;

extracting emergency information from the received signal;

determining an external device that is communicatively coupled to the electronic device; and controlling the external device to generate a type of a sensory feedback that corresponds to an emergency alert, wherein the type of the sensory feedback is based on at least a type of emergency associated with the emergency alert.

18. The non-transitory computer-readable medium according to claim 17, wherein the signal is an Advanced Television Systems Committee (ATSC) 1.0 signal or an ATSC 3.0 signal.

* * * * *